United States Patent [19]

Morrar et al.

[11] Patent Number: 5,428,099
[45] Date of Patent: Jun. 27, 1995

[54] METHOD TO CONTROL CARBON BLACK DISTRIBUTION IN ELASTOMER BLENDS

[75] Inventors: Fred Morrar, Staten Island, N.Y.; Laszlo L. Ban, Florence, N.J.; Walter G. Funk, Mountainside, N.J.; Edward Kresge, Watchung, N.J.; Hsien-Chang Wang, Edison, N.J.; Sudhin Datta, Matawan, N.J.; Robert C. Keller, Morris Plains, N.J.

[73] Assignee: Exxon Chemical Patents Inc., Linden, N.J.

[21] Appl. No.: 64,609

[22] Filed: May 19, 1993

[51] Int. Cl.⁶ ............................................. C08K 3/04
[52] U.S. Cl. ........................ 524/495; 524/496; 524/519; 524/521; 524/523
[58] Field of Search ........... 524/495, 496, 519, 521, 524/523, 525, 526, 527; 525/232

[56] References Cited

U.S. PATENT DOCUMENTS

| 3,448,048 | 6/1969 | LeSuer et al. | 252/51.5 |
| 4,055,402 | 10/1977 | Battersby et al. | 44/58 |
| 4,355,139 | 10/1982 | Coran et al. | 525/133 |
| 4,786,689 | 12/1988 | Lund et al. | 525/250 |
| 4,794,145 | 12/1988 | Lund et al. | 325/250 |
| 4,863,624 | 9/1989 | Emert et al. | 252/51.5 |
| 4,987,200 | 1/1991 | Datta et al. | 526/75 |
| 5,043,392 | 8/1991 | Lunt et al. | . |
| 5,153,282 | 10/1992 | Datta et al. | 526/75 |
| 5,162,445 | 11/1992 | Powers et al. | . |

FOREIGN PATENT DOCUMENTS 325997  8/1989  European Pat. Off. .

OTHER PUBLICATIONS

Callan, Topcik, Ford, Rubberworld 151, 60 1965.
Marsh, Mullens, Price Rubber & Chem Tech 43, 600 1970.
Bauer, Dudley Rubber Chem & Tech. 35, 50 1977.
Sircar, Lamond & Printer Rubber Chem & Tech. 48, 47 1974.
Sicar & Lamond, Rubber Chem & Tech 178, 46 1973.
Schuster, Schmidt & Pampus Kautschuk & Gummi Kunst. vol. 42, p. 590 1989.

Primary Examiner—Edward Cain
Attorney, Agent, or Firm—Catherine L. Bell

[57] ABSTRACT

Elastomers modified by amine groups, particularly diethanol amine, are used for controlling carbon black distribution in elastomer blends.

32 Claims, 10 Drawing Sheets

METHOD TO CONTROL CARBON BLACK DISTRIBUTION IN ELASTOMER BLENDS

FIELD OF THE INVENTION

Elastomers containing amine groups can be used for controlling carbon black distribution in elastomer blends.

BACKGROUND OF THE INVENTION

The useful physical properties of vulcanizates of elastomers are strongly dependant on the nature, concentration and the extent of interaction of the carbon black fillers and the elastomer. These physical properties are exemplified by tensile strength, abrasion resistance, modulus of elongation and resistance to solvents. At decreasing concentrations of carbon black in the elastomer phase these properties degrade rapidly and are essentially useless for the manufacture of articles of commerce.

Physical and mechanical properties of elastomeric materials which cannot be achieved with any one available polymer can be approached by using blends of different polymers. Such blends are known and common examples are blends of butyl rubber with styrene-butadiene rubber or ethylene-propylene diene (EPDM) rubber with acrylate rubbers. Typically these blends will use a combination of rubbers with very different characteristics to approach the desired performance properties. Thus for example a saturated or a slightly unsaturated nonpolar hydrocarbon rubber will be blended with a more unsaturated and/or more polar elastomer (hereinafter "polar/nonpolar elastomer blends"). Typical examples of the saturated or slightly unsaturated elastomer are the following: ethylene-propylene copolymer, polyisobutylene, ethylene-propylene-diene rubber and isobutylene-isoprene rubber. Typical examples of the unsaturated and/or polar elastomers are nitrile-butadiene rubbers, acrylic rubbers, polybutadiene rubbers, styrene-butadiene rubbers, natural rubber and chlorinated polyisoprene.

In blends of two or more of the above elastomers chosen from each of the above categories the development of acceptable physical properties requires the mixing of the blend with carbon black prior to vulcanization. These elastomers are not soluble in each other and exhibit discrete multiphase morphologies when blended. The phase size of each elastomer ranges from submicrometer to several micrometer depending on the composition of the rubber, mixing conditions and their relative viscosities. When carbon black is introduced into these mixtures it has been observed that the carbon black will be nonuniformly distributed among the different elastomers and will concentrate in the more polar/unsaturated elastomer. For example see, Callan, Topcik and Ford in Rubber World 151, 60 (1965) and Marsh, Mullens and Price in Rubber Chem and Tech 43, 400 (1970).

The properties of the vulcanizates of these polar/nonpolar elastomer blends are usually significantly worse than expected values of these properties based on a simple compositionally weighted arithmetic average of the properties of the vulcanized constituent elastomers. As an example, Schuster, Schmidt and Pampus in the journal Kautshuk. Gummi. Kunstst vol 42, p 590 (1989) have described extensive investigations into the formation of vulcanized and unvulcanized blends of nitrile-butadiene rubber (NBR) and EPDM rubber and have concluded that these NBR/EPDM blends do not have the physical, mechanical and use properties expected from a simple weighted arithmetic average of the properties of the two elastomers. As a further example Sircar in Rubber Chem. and Tech. 47, 48 (1974) showed that blends of chlorobutyl rubber and polybuatdiene were characterized by a depletion of carbon black from the chlororbutyl phase and poor physical and mechanical properties of the final vulcanizates.

This unequal distribution of carbon black in polar non-polar elastomer blends and in a single elastomer itself causes uneven physical properties throughout the elastomeric blend. More importantly the bulk properties of such a blend of elastomers reflect those of the weakest component which is the saturated or nearly saturated, nonpolar hydrocarbon polymers deficient in the amount of carbon black. Thus it is highly desirable that carbon black distribution be dispersed in both phases in blends of polar/non-polar elastomers and even more advantageously, controllable.

Previous efforts to control carbon black distribution in polar/non-polar elastomer blends have relied on intricate compounding procedures involving the use of premixed separate masterbatches of nitrile-butadiene rubber and polybutadiene rubber which are then blended together, or using an oil to disperse the carbon black in pre-blends of nitrile-butadiene rubber and polyisobutylene rubber or in blends of nitrile-butadiene rubber and styrene-butadiene rubber. These procedures do not produce elastomer blends containing a uniform or controllable distribution of carbon black in the different elastomer phases. Sircar and Lamond in Rubber Chem. and Tech. 46, 178 (1973) showed carbon black which had been introduced exclusively into chlorobutyl rubber by a preliminary mixing step would migrate away from the saturated elastomer into the more unsaturated elastomer. They also found that this migration could only be retarded or eliminated by increasing the interaction of carbon black and the chlorobutyl rubber either by a thermal or chemical procedures prior to the introduction of the other elastomer. Thus, a need exists in the art to provide a method for controlling carbon black distribution in elastomers and elastomer blends.

SUMMARY OF THE INVENTION

The invention disclosed herein relates to the use of amine functionalized elastomers to control carbon black distribution in elastomers and elastomer blends.

BRIEF DESCRIPTION OF THE DRAWINGS

In FIG. 7 the ethylene copolymer is a primary amine functionalized EPDM, while in FIG. 8 the ethylene copolymer is a non-functionalized EPDM.

In FIG. 9 the polyisobutylene phase contains 94% isobutylene, 4% para-methylstyrene and 2% bromomethylstyrene. In FIG. 10 the polyisobutylene copolymer contains 50% of the isobutylene copolymer described in FIG. 9 and 50% of a DEA grafted to the isobutylene polymer described in FIG. 9.

DETAILED DESCRIPTION OF THE INVENTION

Figure 1:
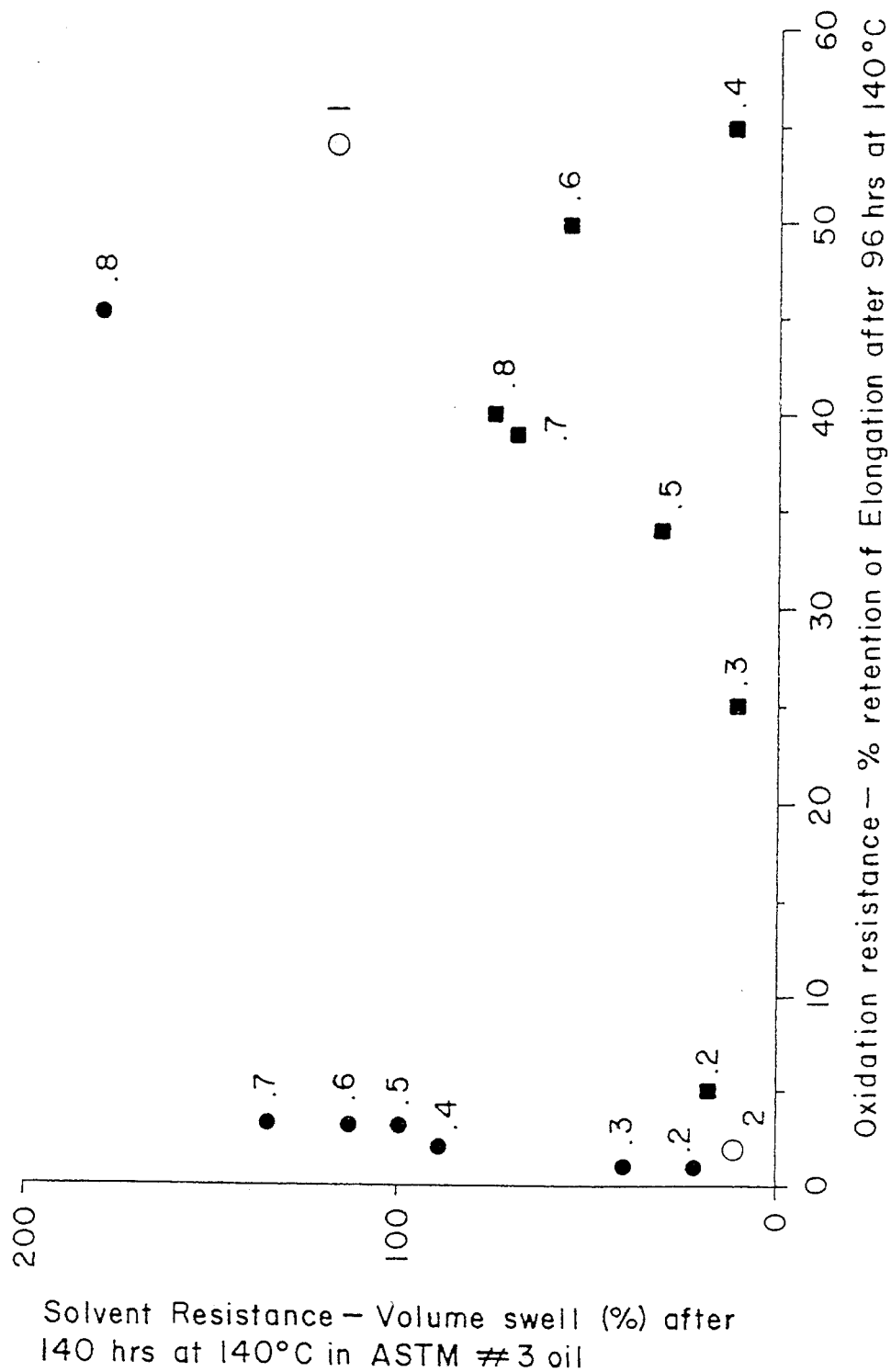
FIG. 1 is a graph of solvent resistance versus oxidation resistance of EPDM/NBR blends. The solvent resistance is measured by the percent increase in volume of a sulfur cured blend when exposed to 140 hours at 140 degrees C. in a bath of ASTM #3 oil. Large numbers indicate a poor resistance to the solvent. The oxidation resistance is measured by the percent retention of elongation of a sulfur cured blend after exposure to air at 140 degrees C. for 96 hours. Small numbers indicate degradation of the elastic network of the blend. The data for the blends of EPDM-amine/NBR (filled squares) is compared to the data for EPDM/NBR blends (filled circles) and to the corresponding data for silimar compounds of EPDM and NBR alone (1 and 2-open circles). The fractional numbers next to the filled data points represents the weight fraction of ethylene copolymers in the total rubber content of these blends.

This invention relates to a composition comprising carbon black, amine functionalized elastomer and at least one other elastomer. This invention further relates to the use of amine functionalized elastomers, preferably amine functionalized saturated or nearly saturated, nonpolar or slightly polar elastomers, even more preferably amine functionalized polyisobutylene or amine functionalized EPDM for controlling the carbon black distribution in polar/non-polar elastomer blends. In particular the inventors have discovered that the distribution of the carbon black among the different elastomer phases in polar/non-polar elastomer blends can be controlled by introducing one or more amine groups along the elastomer backbone and then blending the different elastomers in the presence of carbon black. Primary, secondary and tertiary amine containing grafted elastomers are preferred for modifying the distribution of carbon black.

Preferred elastomer blends contain at least two polymeric components in addition to carbon black. A first polymeric component is an unsaturated, slightly saturated or highly unsaturated polar elastomer (hereinafter "polar elastomer"). These are made by polymerization or copolymerization of monomers which have an intrinsic dipole moment or have a multitude of unsaturation. Typical examples of such monomers are acrylonitrile, vinyl chloride, butadiene, chloroprene and isoprene. The polar elastomer may also be one in which the constituent monomer are intrinsically neither polar or multiply unsaturated but may be easily polarized by chemical or physical interaction. A typical example of such a monomer is styrene. Thus, these unsaturated, slightly saturated or highly unsaturated polar elastomers can contain one or more of the following monomers: acrylonitrile, butadiene, chloroprene, isoprene, styrene, alkyl acrylates, halogenated isoprenes, ethers, epoxides, vinyl pyridine and the like.

The resulting elastomers from the polymerization of these monomers can include the following: acrylonitrile butadiene rubber, styrene butadiene rubber, alkyl acrylate rubber, chlorinated isoprene rubber, acrylonitrile chlorinated isoprene rubber, polybutadiene rubber (both cis and trans), natural rubber, polychloroprene, polyisoprene, and the like. Thus, the polar elastomers may be one or more of the following natural rubber, polybutadiene rubber, acrylonitrile butadiene rubber, polychloroprene rubber, acrylonitrile isoprene rubber, halogenated acrylonitrile isoprene rubber, acrylonitrile chlorinated isoprene rubber, styrene butadiene rubber, styrene butadiene styrene block copolymer, polyisoprene rubber, alkyl acrylate rubber, halogenated isoprene rubber, or chlorinated isoprene rubber.

The second polymeric component is an amine containing non-polar elastomer (including amine functionalized non-polar elastomers). The elastomer is preferably a saturated or nearly saturated, non-polar or slightly polar elastomer (hereinafter "non-polar elastomer"). Examples of preferred elastomers include ethylene alpha-olefin copolymer, ethylene alpha-olefin non-conjugated diene copolymer (specifically ethylene propylene diene rubber), polyisobutylene rubber, or a copolymer of isobutylene and one or more of an alpha olefin, a diolefin, styrene or isoprene and the like.

In alternate embodiments preferred non-polar elastomers include isobutylene/p-methystyrene/p-bromomethylstyrene copolymer or isobutylene/-paramethyl styrene copolymer. Still further in additional preferred embodiments the amine containing polymer can blended with one or more of natural rubber, polybutadiene rubber, acrylonitrile butadiene rubber, polychloroprene rubber, acrylonitrile isoprene rubber, halogenated acrylonitrile isoprene rubber, acrylonitrile chlorinated isoprene rubber, styrene butadiene rubber, styrene butadiene styrene block copolymer, polyisoprene rubber, alkyl acrylate rubber, halogenated isoprene rubber, or chlorinated isoprene rubber.

The amino group may be primary, secondary or tertiary and may be part of an aliphatic or aromatic structure in a linear, branched, cyclic, multi cyclic, alicyclic or heterocyclic structure. Preferred embodiments include ethylene alpha olefin non-conjugated diene copolumer, preferably EPDM, grafted with a primary, secondary or tertiary amine. Primary and secondary amine can be introduced directly via the method disclosed in U.S. Pat. No. 4,987,200, incorporated by reference herein. Secondary and tertiary amines may also be intorduced by first grafting a group reactive towards amines, for example maleic anhydride, acrylic acid or other similar agent, onto the copolymer followed by reacting this polymer with a polyamine, e.g. an alpha, omega-diamine, containing at least one primary or secondary amine group cabable of reacting with the grafted copolymer. These steps are well known in the art and can be practiced accordingly. Another preferred embodiment includes polymers and copolymers of polyisobutylene, particularly isobutylene/para-alkyl styrene and isobutylene/isoprene copolymers grafted with one or more amines, preferably diethanolamine. Examples of suitable grafted polymers can be represented by the formula:

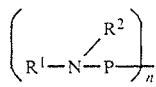

wherein $R^1$ and $R^2$ are independently hydrogen or a C1 to C20 linear, branched or cyclic alkyl, aryl, or aralkyl, provided that $R^2$ and $R^3$ can be joined in a cyclic structure, P is a polymeric segment and n is the number of amine sites. Aralkyl is defined to be a structure containing aliphatic and aromatic groups. For a polymer having an Mn of 100,000 n is at least one, preferably at least 10 and in a preferred embodiment is optimally no more than about 25.

The amine containing polymer are made by methods well known in the art, and some amine functionalized elastomers may be purchased commerically.

Specific methods to produce preferred amine functionalized elastomers are described below.

Isomonoolefin polymers and copolymers can be functionalized for use according to this invention. Isomonoolefin having 4 to 7 carbon atoms copolumerized with paraalkyl styrene (the alkyl having 1 to 10 carbon atoms) is a preferred polymer. Particularly prefered are elastomers including homopolymers of polyisobutylene and copolymers of isobutylene and one or more of comonomers, where the comonomer(s) is present from 0.2 to 40 wt. % based on the weight of the copolymer; preferably from 0.5 to 5 wt. % based on the weight of the copolymer. Comonomers include, but are not limited to, alpha-olefins, diolefins, styrene, isoprene, and an allylic or benzylic halide containing monomer. Of these, the preferred monomers are monomers having an allylic or benzylic chloride, bromide or iodide. The most preferred are copolymers of isobutylene and para (bromo methylene) styrene as described in the published U.S. Pat. No. 5162445 which is incorporated herein by reference. The amine functionalized polymer is most conveniently made by the nucleophilic reaction of a halogenated polyisobutylene containing polymer with Bis -2, 2' ethanol amine(DEA) where the amine groups are left pendant on the polymer. In a general procedure an isobutylene containing up to 5 wt % para (bromo methyl) styrene incorporated is dissolved in toluene under nitrogen. Then 0.1 wt % to 15 wt. % (based upon the weight of the polymer), preferably 0.5 wt % to 4.0 wt % of DEA (sufficient to have at least 1:1 stoichiometry with respect to the amount of bromine present in the polymer) is added. The amine is dissolved in isopropanol, or other suitable solvent and is added slowly at room temperature to produce polymer in a solution of toluene and isopropanol. The solution is typically heated with stirring under nitrogen with reflux to about up to 150° C. to 200° C., preferably to 100° C. for about 3 hours before being allowed to cool. The polymer is recovered by precipitation and the unreacted DEA is removed by kneading the polymer in isopropanol or other suitable solvent. The amine functionalized polymer is further purified by washing and kneading in a 50/50 water/methanol mixture to complete the removal of unreacted DEA and then dried in a vacuum oven. The amine functionality (diethanol amine) is present in the polymer at about 0.01 wt % to about 20 wt. %, preferably about 2.4 wt % to about 2.0 wt. %, based upon the weight of the polymer. Preferred amine containing polymers include isobutylene/p-methylstyrene/p-diethanolaminomethylstyrene copolymer.

Another preferred elastomer for amine functionalizing is EPDM. EPDM is produced by many well known traditional Ziegler-Natta catalysis in hydrocarbon solution, particularly vanadium halides combined with halogenated aluminum alkyls. Synthesis of EPDM is well known in the art. G. ver Strate, Encyclopedia of Polymer Science and Engineering, vol. 6, 2nd Ed., 1986, p. 522-564.

The term EPDM or EP as used herein, unless otherwise indicated, includes terpolymers, tetrapolymers, etc., preferably of ethylene, and a $C_3$-$C_{28}$ alpha-olefin, typically propylene, and/or a non-conjugated diolefin or mixtures of such diolefins which may also be used. The amount of the non-conjugated diolefin will generally range from about 0.5 to 20 wt. percent, preferably about 1 to about 7 wt. percent, based on the total amount of ethylene and alpha-olefin present.

Representative examples of non-conjugated dienes that may be used as the third monomer in the terpolymer include:

a. Straight chain acrylic dienes such as: 1,4-hexadiene; 1,5-heptadiene; 1,6-octadiene.

b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.

c. Single ring alicyclic dienes such as: 1,4-cyclohexadiene; 1,5-cyclooctadiene; 1,5-cyclo-dodecadiene; 4-vinylcyclohexene; 1-allyl, 4-isopropylidene cyclohexane; 3-allyl-cyclopentene; 4-allyl cyclohexene and 1-isopropenyl-4-(4-butenyl) cyclohexane.

d. Multi-single ring alicyclic dienes such as: 4,4'-dicyclo-pentenyl and 4,4'-dicyclohexenyl.

e. Multi-ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene, cycloalkenyl and cycloalkylidene norbornenes such as: ethylidene norbornene; 5-methylene-6-methyl-2-norbornene; 5-methylene-6, 6-dimethyl-2-norbornene; 5-propenyl-2-norbornene; 5-(3-cyclo-pentylidene)-2-norbornene and 5-cyclohexylidene-2-norbornene; etc.

The most preferred EPDM elastomer contains from about 60 to about 80% by weight ethylene, from about 15 to about 35% by weight propylene and from about 3 to about 7% by weight of non-conjugated diene. Synthesis of EPDM is well known in the art. G. ver Strate, *Encyclopedia of Polymer Science and Engineering*, vol. 6, 2nd Ed., 1986, p. 522-564.

An amine functionalized EPDM of this invention can be made by several procedures. In one procedure the EPDM is polymerized with a functional amine unit, typically containing a primary, secondary or tertiary amine. In another procedure the EPDM is grafted first with maleic anhydride then the amine functional group in the presence of a free radical source.

The amine functionalization of the EPDM may also be accomplished by any one of the several procedures known in the art. These may include direct functionalization as demonstrated by U.S. Pat. Nos. 4, 987,200 and 5,153,282 or any of the methods disclosed in U.S. Pat. Nos. 3,448,048; 4,055,402; 5,162,445; 4,863,624; 5,043,392; 4,355,139; 4,786,689; 4,794,145; or 4,707,521, all of which are incorporated by reference herein.

The reaction of the EP or EPDM with the functional group can be carried out in the presence of a free radical source. The EP or EPDM may be functionalized with the amine at temperatures generally less than 300° C., preferably from about 80° C.–250° C., in the presence of free radical sources. Suitable free radical sources are, for example, peroxides such as benzoyl peroxide, ditertiary butyl peroxide, tertiary butyl hydroperoxide, tertiary butyl peroxypivalate, cumene hydroperoxide, cumene hydroperoxide, p-menthane peroxide, p-menthane hydroperoxide compounds or azo compounds, such as azobis (isobutyronitrile), or irradiation sources. Suitable irradiation sources include, for example, those from cobalt, uranium, thorium, and the like and ultraviolet light. The amount of peroxide or free radical agent used is generally quite low being of the order of about 0.01 to about 0.5 percent based on the weight of the EPDM. The reaction may be carried out in a batchwise manner in a batchwise manner in an intensive mixer or in a continuous process in an extruder. Following this grafting reaction the anhydride group is reacted with a polyamine containing at least one primary amine and one or more tertiary or secondary amine. Representative examples of such amines are N, N-dimethyl ethylene diamine, diethylene triamine, N-amino propyl morpholine or amino ethyl piperazine.

Any carbon black may be used in this invention. Preferred carbon blacks, among others, useful in this invention are N234, N650 and N762. The first one is well known tread black, the last two are general purpose moderately reinforcing carbon blacks manufactured by a number of different companies including Ashland Chemical Co., Cabot, Columbian Chemicals, Continental Carbon, J.M. Huber, and Phillips Chemical. The carbon blacks used in examples to this invention are N234 and Raven 1040 (Oxidized, Columbian Chemical).

The amine functionalized elastomer second component may then be blended with at least one of the elastomers listed above as first components. Typically, a master blend with 5 to 95 phr, preferably 10 to 90 phr amine modified elastomer and 95 to 5 phr, preferably 90 to 10 phr polar elastomer is made by using an intensive mixer such as a banbury mixer, a rubber mill or a compounding extruder to mix the two components. The master blend is then mixed with 5 to 180 phr, preferably 10 to 150 phr carbon black. The resulting blend has a more carbon black in the non-polar phase when compared to a blend of the same elastomers with out the amine graft. In perferred embodiments carbon black is present is the non-polar phase of the blend, preferably the concentration of the carbon black in the non-polar phase (first polymeric component) phase is at least about 20 to 200 percent or more of the concentration of the carbon black in the polar (second polymeric component) phase. In a preferred embodiment the resulting blend has a substantially uniform carbon black dispersion in the elastomer phases. Other mixing procedures that are well known in the art can also be used.

It is also contemplated by this invention that more that one amine functionalized elastomer may be used and that more than one polar elastomer may be used in the compositions of this invention. It is further contemplated the compositions comprising amine functionalized non-polar elastomer, polar elastomer and carbon black may further comprise non-amine-functionalized nonpolar elastomers. For the purposes of this invention and the claims thereto the polar elastomers and the non-polar elastomers lacking amine functionality will be referred to as "dissimilar elastomers." Specific examples of dissimilar elastomer include one or more of natural rubber, polybutadiene rubber, acrylonitrile butadiene rubber, polychloroprene rubber, acrylonitrile isoprene rubber, halogenated acrylonitrile isoprene rubber, acrylonitrile chlorinated isoprene rubber, styrene butadiene rubber, styrene butadiene styrene block copolymer, polyisoprene rubber, alkyl acrylate rubber, halogenated isoprene rubber, or chlorinated isoprene rubber.

The elastomer blends of this invention may, if desired, include one or more other well known additives such as, for example antioxidants, ultraviolet absorbers, antistatic agents, release agents pigments, colorants, or the like; however, this should not be considered a limitation of the present invention.

The compositions of this invention comprising amine functionalized elastomer, one or more dissimilar elastomers and carbon black can be formed into articles such as belts, hoses, bumpers, interior automotive parts, exterior automotive parts, containers and the like. These compositions can also be injection molded, blow molded, melt blown, and the like.

As will be recognized by one of ordinary skill in the art, the examples which follow are embodiments of the invention and it is not intended that the invention be limited thereby.

ANALYSIS OF CARBON BLACK DISTRIBUTION

The carbon black distribution was determined by using Transmission Electron Microscopy (TEM). Thin sections, thickness equal to 70–100 nm, were cut with a cryoultramicrotome and then imaged with the TEM using 100 kilovolt electrons. The TEM was fitted with an efficient liquid nitrogen cooled anticontaminator which prevented contamination build up on the thin sections during imaging. The images were recorded at 18,000 (negative) magnification and then printed to higher ($\times 25$) magnifications (positive image) from these. During imaging of blends containing a PIB backbone, the PIB backbone scissions and evaporates into the TEM's high vacuum; which allows differentiation between the polymer domains.

EXAMPLES

Blends of the polymers and carbon black along with the optional agents as specified in the examples below were prepared in an intensive internal mixer such as a 300 cc Banbury mixer or a 90 cc Haake mixer at temperature not to exceed 250° C. or more typically between 80° C. and 150° C. The mixing was done at 40 to 60 rpm in both types of internal mixers for between 7 and 9 minutes. This mixing time is deemed sufficient to allow any migration of carbon black between the phases of dissimilar elastomer blends to reach equilibrium.

Example 1

Synthesis of isobutylene-para-methylstyrene copolymer containing diethanol amine.

Isobutylene/para-methylstyrene/para-diethanolaminomethylstyrene copolymer was prepared in accordance with the technique of U.S. Pat. No. 5,162,445 which is incorporated by reference herein. In the nucleophilic substitution reaction, 500 g of isobutylene/p-methylstyrene/p-bromomethylstyrene copolymer (1.7 mole % p-methylstyrene, 0.7 mole % p-bromomethylstyrene 30 ML @ 125° C.) was dissolved in 2267 g of toluene in a 5-liter resin flask under nitrogen to form an 18 wt. % solution. Then 24.6 g diethanol amine (Aldrich, 99%) in 567 g of isopropanol was added slowly with stirring at room temperature to give a 14.9 wt % polymer solution in an 80/20 (weight/weight) toluene/isopropanol solvent blend. The solution was heated with stirring under nitrogen to reflux at about 87° C. for 3 hours before being allowed to cool. The polymer was recovered by precipitation and kneading in isopropanol. The recovered "wet" polymer was further purified by washing and kneading in a 50/50, water/methanol mixture to complete the removal of unreacted diethanolamine and then vacuum-oven dried at 70° C. for 48 hours with 0.2 wt. % BHT mixed as an antioxidant. The polymer was characterized by 'H NMR and showed the complete conversion of p-bromomethyl to diethanolaminomethyl functionality (0.7 mole % DEA).

Example 2

Synthesis of EPDM containing a primary amine functionality 5-norbornene-2-methyl amine was made by the Diels Alder reaction of equivalent quantities of cyclopentadiene and allyl amine at 175° C. for 24 h at pressures ranging from 1100 kpa to 500 kpa. The crude product was recovered and fractionally distilled with cracking of unreacted dicyclopentadiene to produce the 5-norbornene-2-methyl amine as a clear, colorless liquid boiling at 178° C. The yield of this material based on the amount of allyl amine used was 47%.

50.55 g of 5-norbornene-2-methyl amine and 76.1 g of diisobutyl aluminium hydride were reacted at 0° C. by slow addition of lattter to the former in 800 ml of 50% hexane/50% pentane solution to form quantitaively the adduct, 5-norbornene-2-methyl (N-diisobutyl aluminium) amide. The reaction is exothermic and cooling was maintained during the addition. This solution was then heated to 45° C. for a few minutes to remove the hydrogen formed by the reaction and the solution was rapidly cooled top room tempertaure.

EPDM Polymerization was conducted in a 980 ml continuous feed stirred tank reactor agitated at 1200 rpm and maintained at 40° C. The following feeds were continually added to the reactor:

Hexane—5.41 lit/hr
Ethylene 150 g/hr
Propylene 120 g/hr
ENB 13 g/hr
5-norbornene-2-methyl (N-diisobutyl aluminium) amide 7.46 g/hr
Hydrogen 50 ppm on ethylene
Vanadium tetrachloride 0.492 g/hr
Ethyl Aluminium dichloride 6.58 g/hr Rapid and exothermic polymerization ensued to yield a polymer which after removal of most of the aluminium and vanadium residues analysed as the following:

Polymerization rate 218 g/hr
Ethyelene content 64.7 wt. %
ENB content 4.56 wt. %
5-norbornene-2-methyl amine content 2.16 wt. %
ML @ 125 (1+4) 73.7

Example 3

A master blend of 50 wt. % of a terpolymer of 94 wt. % isobutylene, 2 wt. % para-bromemethylstyrene and 4 wt. % para -methylstyrene (I-PMS) and 50 wt. % SBR (13.7 wt. % butadiene) was prepared in the Haake mixer using the small (60 ml) mixing head. The two polymers were added simultaneously to the mixer at about room temperature and mixed for 5 minutes at 120 degrees C. at 30 rpm. Next, a portion of the master blend was mixed with 50 phr carbon black (N234) in the same mixture at 80 rpm for 9 minutes with the black added at one minute. Mix temperature at dump was 149° C. A second portion of the master blend was mixed with 50 phr carbon black (Raven 1040, oxidized black) as above. Mix temperature at dump was 157° C. Substantially all of the carbon black resided in the SBR phase and none in the isobutylene copolymer. Examples 4–7

Styrene-butadiene rubber (SBR) (13.7 wt. % butadiene), polybutadiene (BR) and a terpolymer of 94 wt. % isobutylene, 2 wt % para-bromemethylstyrene and 4 wt. % para -methylstyrene with 0.7 mole % DEA (I-PMS-g-DEA) were blended according to the procedure in example 3 with carbon black and a processing oil. The blend compositions and carbon black distribution are reported in the table 1 below. The following mixing procedure was used in examples 4–13. Control experiments were done with the terpolymer of 94 % isobutylene, 2 wt. % para-bromemethylstyrene and 4 wt. % of para-methylstyrene(I-PMS). Rotor Speed 112 rpm, Dump Temperature 140°–150° C.

| Time, min | Action |
|---|---|
| 0 | Add polymer(s) (I-PMS; SBR; BR) |
| 1 | Add: ⅔ C.B., $^a$DEA |
| 2½ | Add: ⅓ C.B. (and oil if used) |
| 5 | Sweep in |
| 7–9 | Dump |

$^a$⅓ of atomic equivalents of total Br.

These examples show that in polymer blends containing more of the highly unsaturated rubber phase (SBR and BR) and containing a process oil (Flexon 641), that with DEA modified terpolymer of 94 wt. % isobutylene, 2 wt. % para-bromemethylstyrene and 4 wt. % para -methylstyrene, the carbon black distribution is controlled. In all cases where the polymer was modified to contain DEA functionality, a uniform carbon black distribution was obtained. In example 5, where there was no DEA modification, there was no carbon black in the isobutylene copolymer phase.

TABLE 1

CARBON BLACK DISTRIBUTION (BY TEM$^a$) OF POLYMER BLENDS CONTAINING DIETHANOLAMINE MODIFIED I-PMS$^b$

Figure 9:
FIGS. 9 and 10 are transmission electron microscope micrographs of blends of 15 phr polyisobutylene copolymer, 51 phr of styrene butadiene rubber, 34 phr of butadiene rubber, 60 phr of carbon black N234, and 25 phr of process oil.
Figure 10:

| Example | Compound | TEM Observation |
|---|---|---|
| 4 | 10 wt % I-PMS-g-DEA*; 5 wt % I-PMS; 51 wt % SBR; 34 wt % BR; 60 phr N234; 25 phr Flexon 641 | C.B. uniformly distributed among polymer phases. |
| 5 | 15 wt. % I-PMS; 51 wt. % SBR; 34 wt. % BR; 60 PHR N234; 25 phr Flexon 641 | C.B. not uniformly distributed in polymer phases and there is none in the isobutylene copolymer phase. (FIG. 9) |
| 6 | 7.5 wt. % I-PMS-g-DEA; 7.5 wt. % I-PMS; 51 wt. % SBR; 34 wt. % BR; 60 phr N234; 21.25 phr Flexon 641 | C.B. uniformly distributed among polymer phases (FIG. 10). |
| 7 | $^d$9 wt. % I-PMS-g-DEA; 9 wt. % I-PMS; 49 wt. % SBR; 33 wt. % BR; 49 phr N234; 9 phr Raven$^c$ 1040; 20 phr | C.B. uniformly distributed among polymer phases. |

TABLE 1-continued

CARBON BLACK DISTRIBUTION (BY TEM[a])
OF POLYMER BLENDS CONTAINING
DIETHANOLAMINE MODIFIED I-PMS[b]

| Example | Compound | TEM Observation |
|---|---|---|
| | Flexon 641 | |

[a]Transmission electron microscope.
[b]Brominated copolymer of a terpolymer of 94 wt. % isobutylene, 2 wt. % para-bromomethylstyrene and 4 wt. % para-methylstyrene (Br-I-PMS)
*0.7 mole % DEA
[c]Oxidized carbon black.
[d]Master batched compounds from example 3. (0.7 mol % DEA)

Examples 8–10

It has also been found that I-PMS (terpolymer of 94 wt. % isobutylene, 2 wt. % para-bromemethylstyrene and 4 wt. % para-methylstyrene can be modified during the mixing procedure (in-situ) to incorporate DEA and control the carbon black distribution.

After mixing, the blends were examined by TEM with the results shown in the following table 2.

TABLE 2

CARBON BLACK DISTRIBUTION (BY TEM)
OF POLYMER BLENDS CONTAINING
DIETHANOLAMINE MODIFIED BrI-PMS
MADE IN-SITU

| Example | Compound | TEM Observation |
|---|---|---|
| 8 | [a]15 wt. % I-PMS; 51 wt. % SBR; 34 wt. % BR; 60 phr N234; 25 phr Flexon 641 Diethanolamine[a] | C.B. uniformly distributed among polymer |
| 9 | [b]15 wt. % I-PMS; 51 wt. % SBR; 34 wt. % BR; 60 phr N234; 21.25 phr Flexon 641; Diethanolamine[a] | C.B. uniformly distributed in polymer phases. |
| 10 | [b]18 wt. % I-PMS; 49 wt. % SBR; 33 wt. % BR; 49 phr N234; 9 phr Raven 1040; 20 phr Flexon 641; Diethanolamine[a] | C.B. uniformly distributed among polymer phases. |

[a]Amount added was based on 50% of the total Br content of the Br-I-PMS.
[b]Master batched compound.

These examples show that DEA can be incorporated during mixing with I-PMS to achieve controlled carbon black distribution.

Examples 11–13

SBR (styrene butadiene copolymer), BR (polybutadiene) and BIIR (isobutylene/isoprene brominated copolymer) were blended with carbon black, a processing oil and diethanolamine to make modified BIIR polymer. These examples show that a PIB (polyisobutylene) based polymer containing an allyic halide can be modified during mixing to control carbon black distribution. Mixing was carried out by the same procedure as used in examples 8–10. The results of TEM examination is shown in the following table 3.

TABLE 3

CARBON BLACK DISTRIBUTION (BY TEM) OF
POLYMER BLENDS CONTAINING DIETHANOLAMINE
MODIFIED BIIR. - MADE IN-SITU

| Example | Compound | TEM Observation |
|---|---|---|
| 11 | [b]18 wt % BIIR; 49 wt % SBR; 33 wt % BR; 49 phr N234; 9 phr Raven 1040; 20 phr Flexon 641; Diethanolamine[a] | C.B. uniformly distributed among polymer phases. |
| 12 | 15% BIIR; 51% SBR; 34% BR; 60 phr N234; 25 phr Flexon 641 | Very little carbon black is in the BIIR phase. |
| 13 | 15 wt % BIIR; 51 wt % SBR; 34 wt % BR; 60 phr N234; 25 phr Flexon 641; Diethanolamine[a] | C.B. is located in all polymer phases |

[a]Amount added was based on 50% of the total Br content of the BIIR.
[b]Master batched compound.

Example 12 shows that if the bromobutyl rubber (BIIR) is not modified with DEA, there will be an unacceptably low level of carbon black in the PIB phase. With DEA modification the carbon black distribution is controlled.

Example 14

Blends of the rubbers (NBR, EPDM-amine or EPDM) with C-black and curatives were made in a 300 cc Midget Banbury internal mixer according to the following formulation. The total time of mixing was approximately 8 minutes and the temperature at the end of the mixing cycle was controlled to be approximately 160° C.

Rubber*—100 phr
N 234 C-Black—65 phr
Process Oil*20 phr
Stearic Acid—1.5 phr
Zinc Oxide—5 phr
Aminox—1 phr
Sulfur—0.7 phr
Santocure—1.5 phr
TMTDS—2.0 phr (Items marked with * are defined below)

The rubber component of the above blend is composed of either 1a or 1b from the list below and 2% (1a)EPDM—70% ethylene, 5% ENB and Ml(1+4) @ 125=55, (1b)Amino EPDM—70% ethylene, 5% ENB, 2.3% 5-Norbornene-2-methyl amine and Ml(1+4) @ 100=1 made according to the procedures of U.S. Pat. No. 4,987,200 or (2) NBR—Paracril B from Uniroyal Chemical with 28% acrylonitrile and Ml(1+4) @ 125=45. The portions of either of 1a or 1b and 2 in the formulation above are defined by x and 100-x, respectively.

The process oil was a mixture of Sunpar 150 (SP), a paraffinic process oil from Sun Oil Corporation and Dioctyl sebacate (DOS). The proportion of Sunpar 150 and Doctyl sebacate in the above mixture is defined as y and 20-y, respectively. The variables of x and y in the above formulation are related by the following equation $$\frac{x}{100-x} = \frac{y}{20-y} \qquad (1)$$

Thus the composition of the process oil mixture is defined by the composition of the rubbers used in the formulation.

Formulations were made with various values of x (and corresponding values of y) as shown in the Table 2 below. The polymer blends were cured at 160° C. into thin sheets and test samples were removed for testing of the oxidation resistance (by heat aging for 96 hours at 140° C.) and solvent resistance (by immersion in paraffinic oil at 140° C. for 140 hours). The results are shown below in Table 4. All proportions in Table 4 are in percent by weight.

TABLE 4

| Components | A | B | C | D | E | F | G | H | I | J | K | L | M | N | O | P |
|---|---|---|---|---|---|---|---|---|---|---|---|---|---|---|---|---|
| Paracril B (100-x) (NBR) | 100 | 80 | 80 | 70 | 70 | 60 | 60 | 50 | 50 | 40 | 40 | 30 | 30 | 20 | 20 | 0 |
| Amino-EPDM (x) | 0 | — | 20 | — | 30 | — | 40 | — | 50 | — | 60 | — | 70 | — | 80 | — |
| EPDM (x) | 0 | 20 | — | 30 | — | 40 | — | 50 | — | 60 | — | 70 | — | 80 | — | 100 |
| DOS (20-y) | 20 | 16 | 16 | 14 | 14 | 12 | 12 | 10 | 10 | 8 | 8 | 6 | 6 | 4 | 4 | 0 |
| SP (y) | 0 | 4 | 4 | 6 | 6 | 8 | 8 | 10 | 10 | 12 | 12 | 14 | 14 | 16 | 16 | 20 |
| CURE @ 160 C. | | | | | | | | | | | | | | | | |
| Mh (in-lb) | 59 | 67 | 67 | 64 | 60 | 70 | 56 | 68 | 55 | 65 | 46 | 64 | 39 | 63 | 38 | 100 |
| Max Rate (in-lb/min) | 60 | 56 | 56 | 48 | 52 | 44 | 40 | 38 | 38 | 32 | 30 | 30 | 20 | 23 | 19 | 39 |
| Tensile (MPa) | 19 | 13 | 14 | 11 | 11 | 13 | 9 | 12 | 7.2 | 10 | 5.5 | 10 | 3.5 | 12 | 3.6 | 26 |
| % Elongation | 223 | 160 | 155 | 141 | 117 | 181 | 109 | 231 | 94 | 281 | 77 | 445 | 39 | 490 | 35 | 418 |
| Toluene Extr. 48 hrs. 107 C. Fraction of EP lost | 0.0 | 35 | 10 | 53 | 56 | 64 | 66 | 49 | 64 | 56 | 55 | 45 | 59 | 16 | 53 | 39 |
| Heat aging 96 hrs @ 140 C. % Elongation retained | 2.2 | 1 | 4.5 | 1 | 26 | 2 | 55 | 3 | 34 | 2 | 65 | 2 | 100 | 45 | 114 | 54 |
| Oil Immersion 140 hrs @ 140 C. | | | | | | | | | | | | | | | | |
| % Tensile retained | 90 | 113 | 125 | 72 | 107 | 34 | 90 | 21 | 20 | 9 | 9.1 | 5 | 1 | — | — | — |
| % change in volume | 12 | 22 | 18 | 47 | 11 | 90 | 13 | 100 | 31 | 112 | 55 | 135 | 69 | 180 | 75 | 117 |

Comparison of the data in Table 4 for the compositions with EPDM and amino-EPDM as the blend component shows that only the blends with amino EPDM simultaneously show excellent resistance to oxidation as given by the extent of retention of elongation in the samples which have been aged in the hot air oven and excellent resistance to solvent as shown by the resistance to volume change for the samples which have been immersed in oil. This resistance to solvents is also shown by the lower amount of EP (either amino EPDM or EPDM) extracted by refluxing toluene for the samples with amino-EPDM versus those with EPDM alone. This difference in the solvent resistance and oxidation resistance for these blends is dramatically illustrated in the FIG. 1 which shows the data for the volume swell in oil and the loss of elongation in heat aged samples plotted against each other for the EPDM-NBR and amino EPDM-NBR blends.

Example 15

Approximately 450 gms of wet amino functionalized EPDM having a composition of 61% ethylene, 5% ENB and 1.9% 2-amino methyl-5-norbornene and a molecular weight determined as ML(1+4) @ 125° C. of 12 was dissolved in approximately 8 liters of hot toluene under nitrogen in a round bottom flask equipped with a Dean-Stark azeotrope trap. After the dissolution was complete about 1 liter of the solvent was removed to remove most of the water entrained i the polymer and the solvent and to leave a residue of a dry solution of the amino functionalized EPDM. An aliquot of the solution was removed and the concentration of the polymer in this sample was determined by evaporation of he solvent, to be 0.0566 gm polymer/gm solution.

Several Erlenmeyer flasks of 600 cc capacity and equipped with a sealed cover and a magnetic stirbar were dried and to each was added 20 g of Carbon Black N-330 (ASTM). To each flask was added an aliquot of the dried solution of the amino functionalized EPDM, followed by an additional amount of dry toluene. The amounts of these compounds are shown in the following Table 5:

TABLE 5

| Sample Number | ml of amino EPDM solution | ml of toluene |
|---|---|---|
| 1 | 185 | 265 |
| 2 | 140 | 310 |
| 3 | 110 | 340 |
| 4 | 85 | 365 |
| 5 | 70 | 380 |
| 6 | 55 | 395 |
| 7 | 40 | 410 |
| 8 | 30 | 420 |
| 9 | 130 | 185 |
| 10 | 130 | 155 |
| 11 | 130 | 125 |
| 12 | 130 | 90 |
| 13 | 130 | 60 |
| 14 | 130 | 30 |

These mixtures were magnetically agitated rapidly for 60 to 90 minutes at room temperature and allowed to equilibrate for 24 hours. At the end of this period the toluene solution and the residual C-black were separated by centrifugation at 2500 rpm for several minutes and the supernatent was decanted. These supernatants were slightly dark due to the presence of some occluded C-black. The concentration of the solid in the fraction of these solids which was the amino functionalized EPDM was determined by TGA analysis between 25° C. and 400° C. Typically, 97 to 98% of these solids were amino functional EPDM in equilibrium with the C black residue in the flask.

Figure 2:
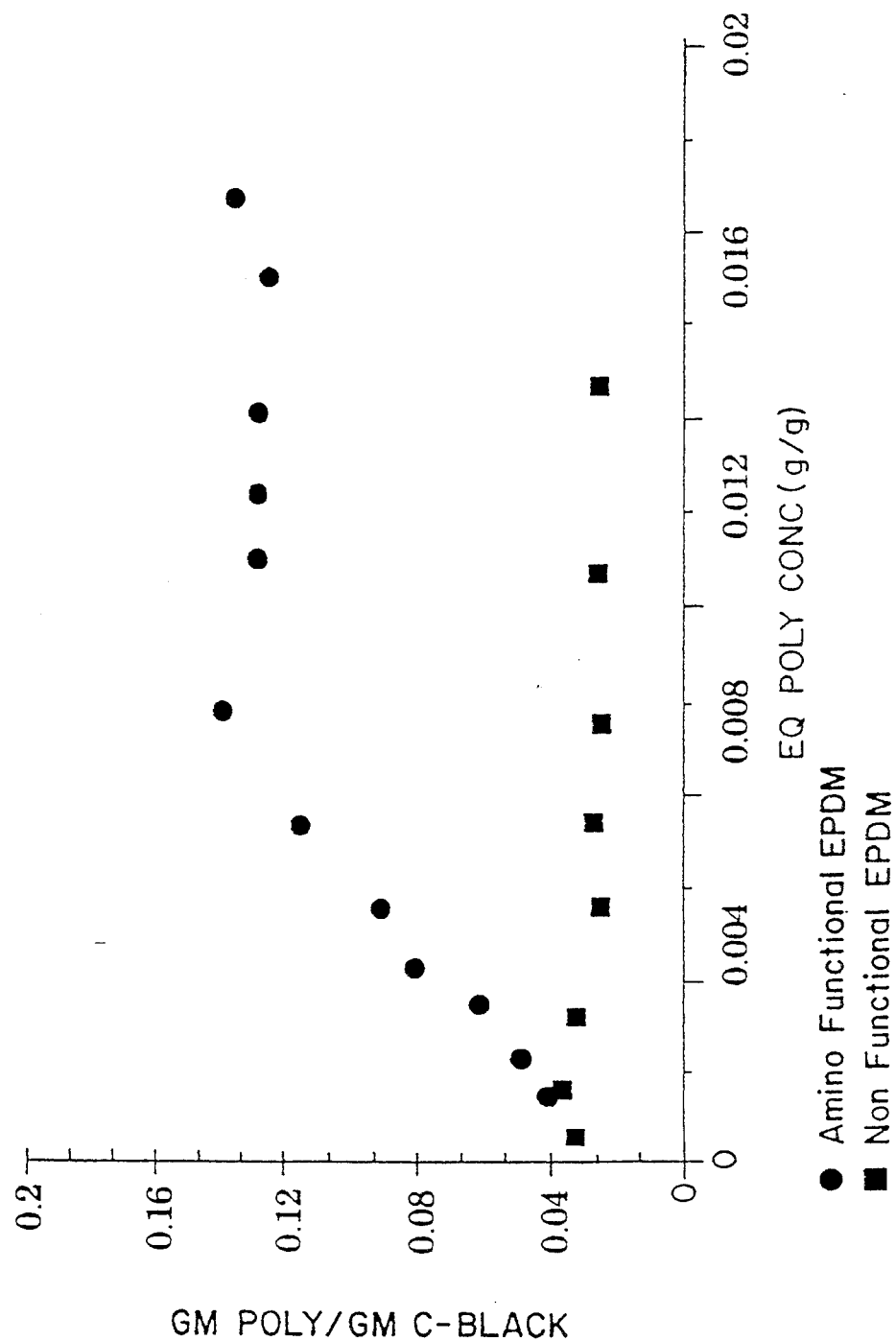
FIG. 2–6 are the graphs for the absorbtion of EPDM (filled squares) and EPDM-amine (filled circles) containing primary amine functionality with five different types of carbon black which differ in the surface area and partical size (N219, N762, N330, N234 and N550, respectively). The ordinate in each case is the grams of ethylene copolymers absorbed per gram of carbon black. The abscissa in each case is the equlibrium concentration of polymer in solution measured in units of grams per milliliter.
Figure 3:
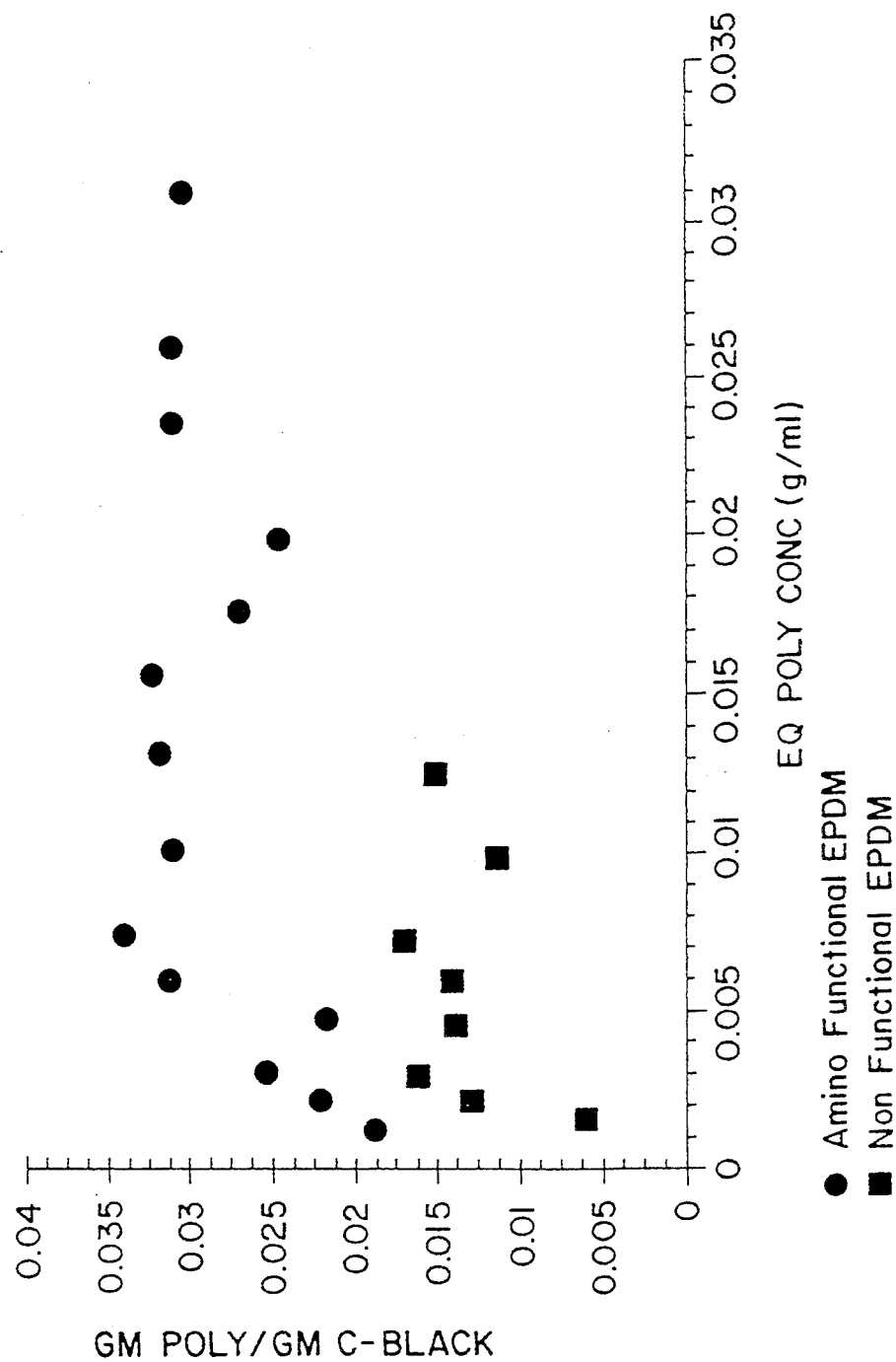
Figure 4:
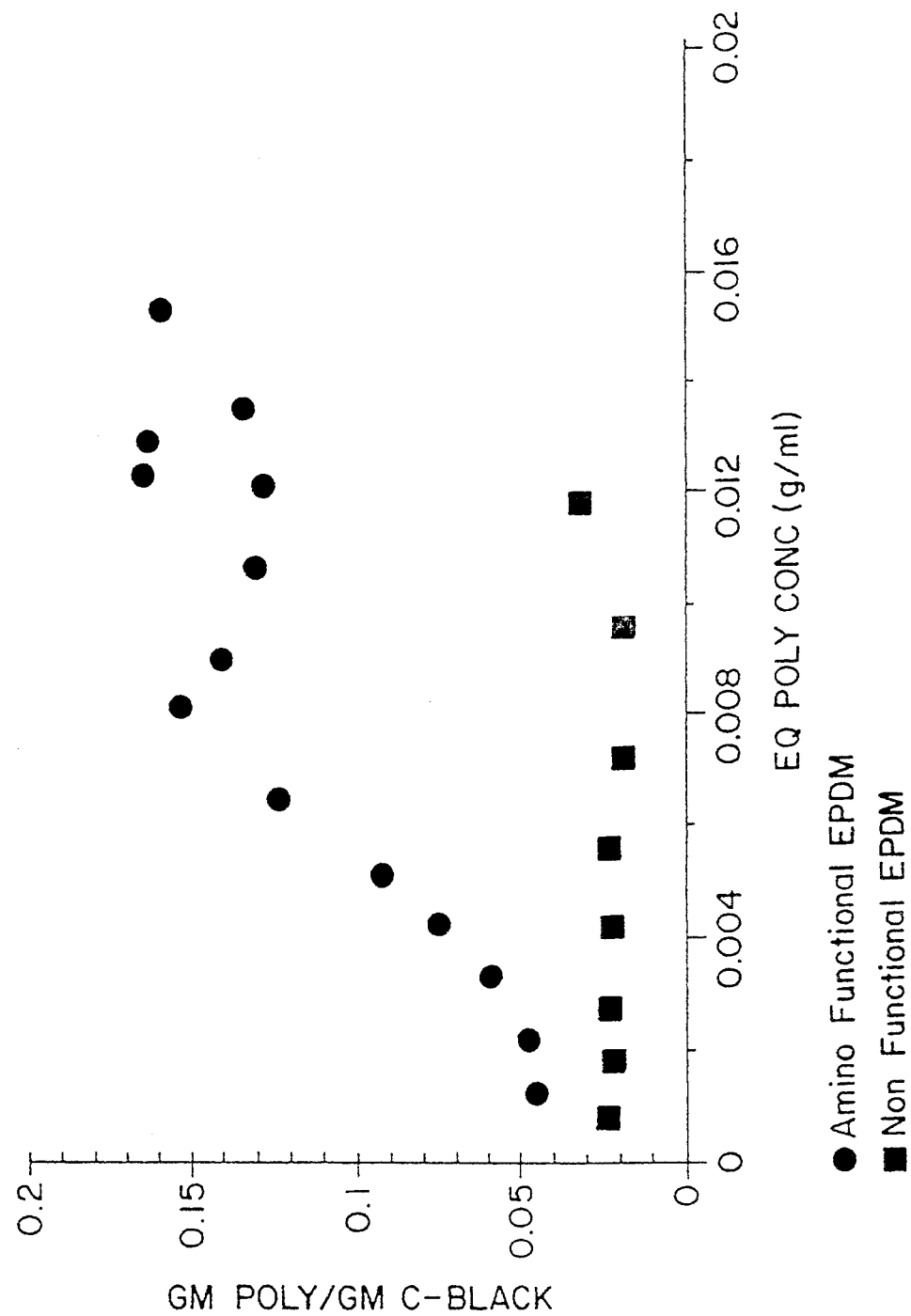
Figure 5:
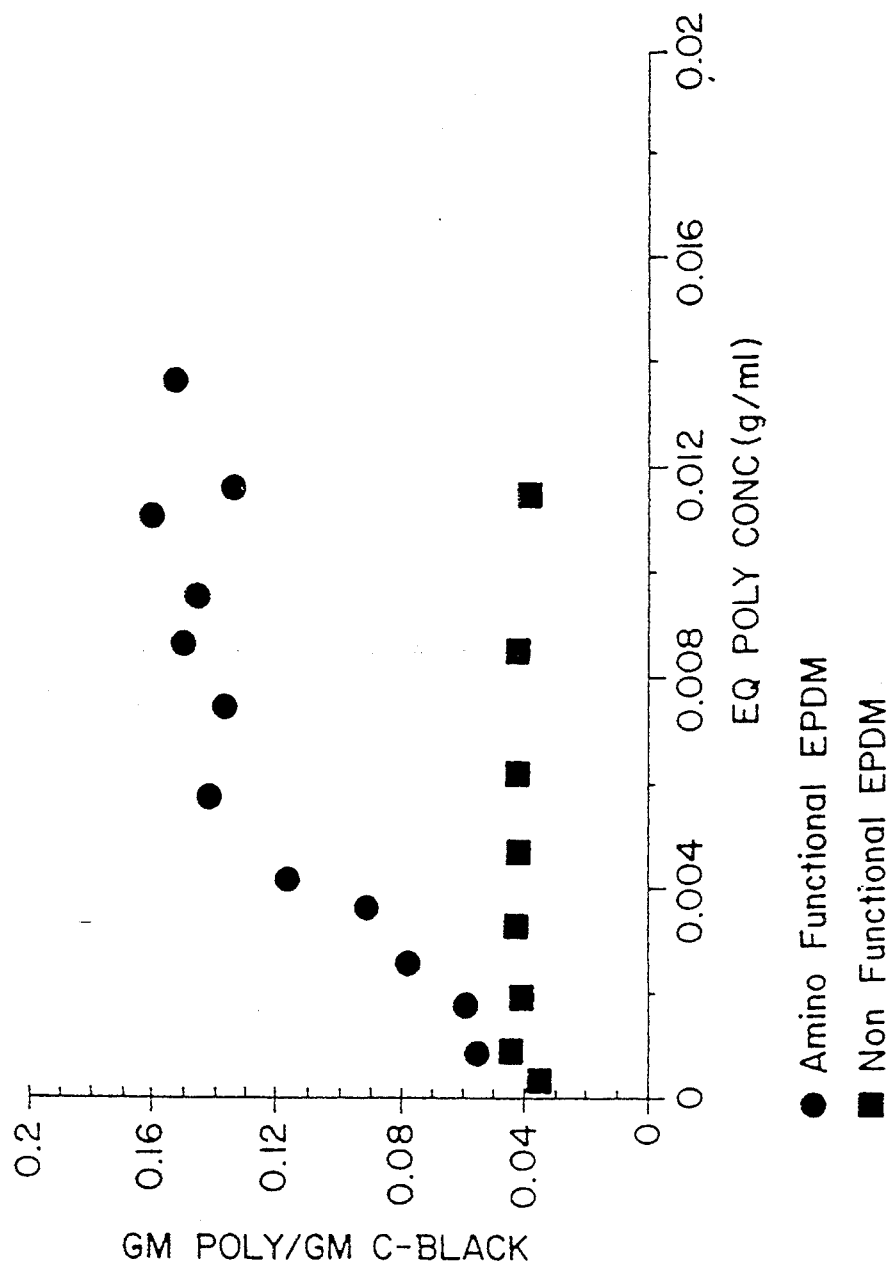
Figure 6:
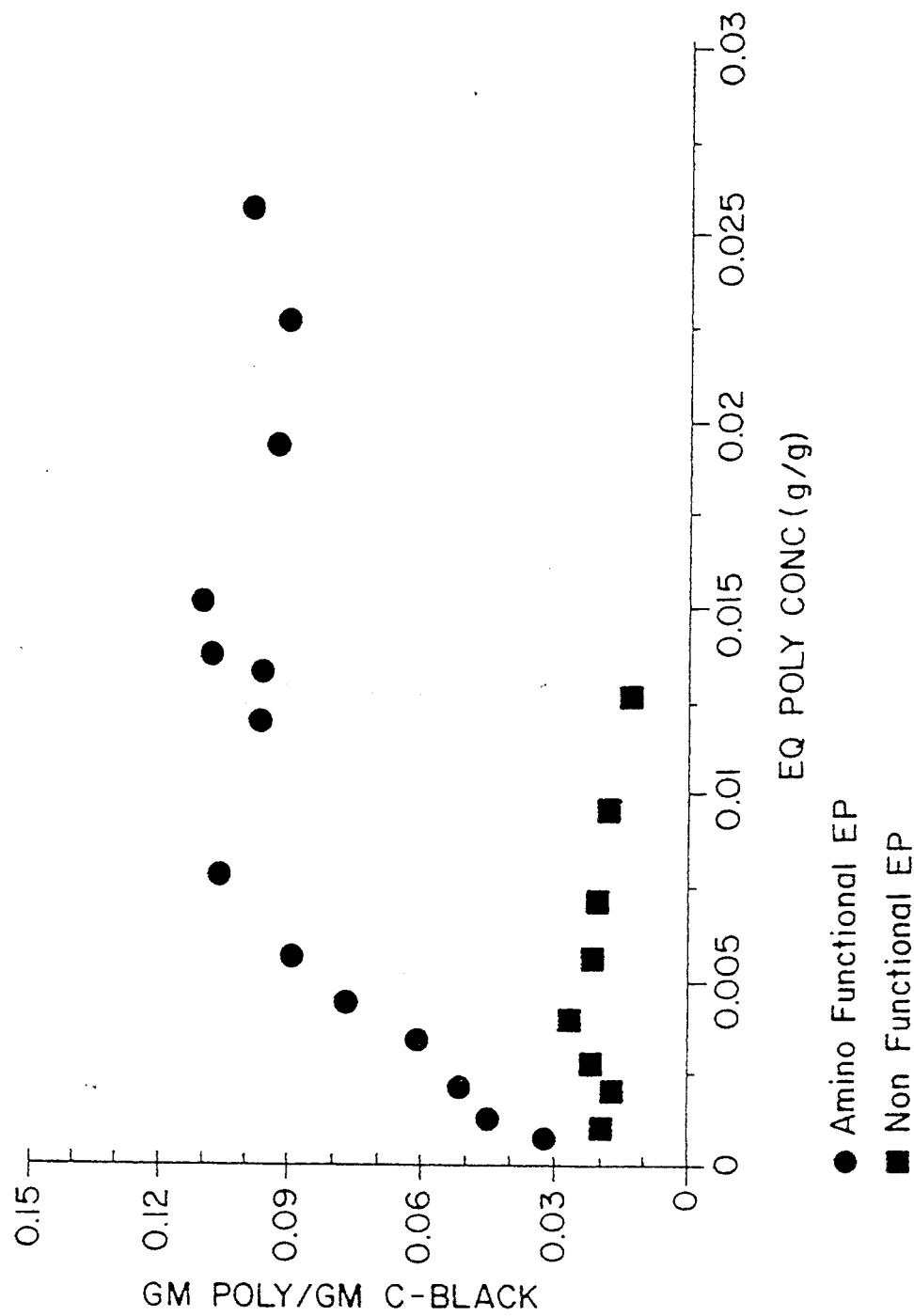
Figure 7:
FIGS. 7 and 8 are transmission electron microscope micrographs of blends of 42 phr NBR, 18 phr of ethylene copolymer, 24 phr of carbon black N234 and 16 phr of parafino process oil.
Figure 8:
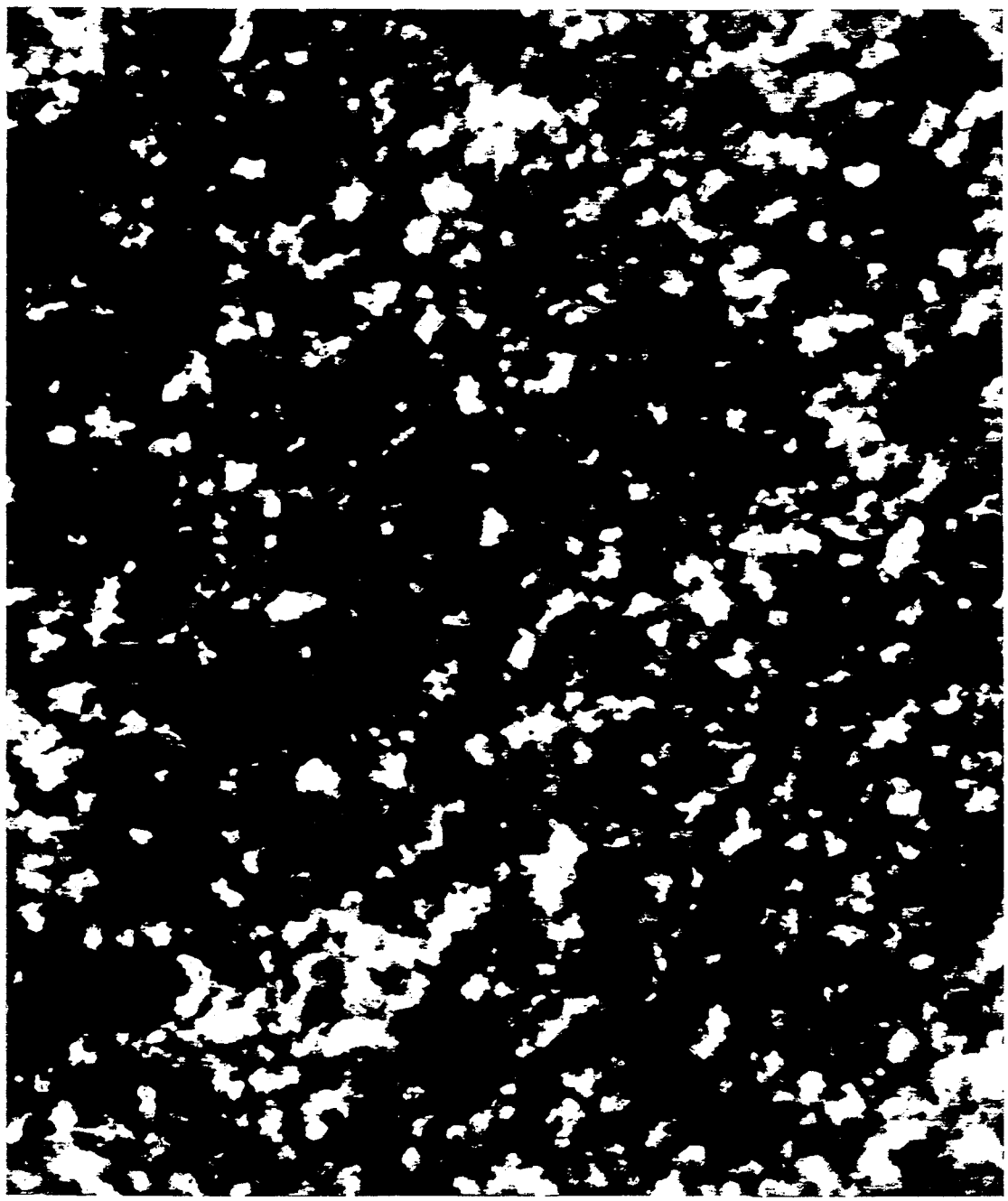

The amount of polymer absorbed onto the C black is difference between the amount of polymer added to the solution and the amount of polymer in solution after the reaction. The results of this experiment are shown as a plot of the equilibrium polymer concentration in solution (gm polymer/gm of solution) as the abcissae versus the concentration of the polymer absorbed onto the C black (gm polymer/gm C black) as the ordinate. This is shown in FIG. 2 (C Black N219) as round symbols. The experiment was repeated for a non functional EPDM having a composition of 56% ethylene, 5% ENB and ML(1+4) @ 125° C. of 47. The data for this experiment is shown on the same graph as square boxes. The above pair of experiments was repeated for C Black N762, N330, N234 and N550. The results of these experiments are shown in FIGS. 3, 4, 5 and 6, respectively. Analysis of the data shows hat in all cases the amino functional EPDM is absorbed to a greater extent than the non-functional EPDM. The data for the absorption plateau which correspond to the maximum amount of polymer which can be absorbed on the surface of the carbon black is shown in Table 6. These data show that carbon black has more affinity for amine containing non-polar elastomers that the non-functionalized parent.

TABLE 6

| C Black ASTM | Surface Area (nitrogen) m**2 gm | Structure factor (DBPA) cc/100 g | Absorption Plateau gm poly/gm c-black | |
|---|---|---|---|---|
| | | | Amino funct. EPDM | Non funct. EPDM |
| N234 | 125 | 120 | 0.15 | 0.04 |
| N330 | 80 | 100 | 0.15 | 0.02 |
| N550 | 38 | 120 | 0.10 | 0.02 |
| N219 | 120 | 75 | 0.13 | 0.03 |
| N762 | 25 | 65 | 0.03 | 0.01 |

Example 16

54 gms of an amino EPDM (Composition: 70% ethylene, 5.3% ENB and 2.5% of incorporated 2-methyl amino-5-norbornene, Molecular weight ML(1+4)=2) were mixed with 126 gms of Paracril B (Composition: 285$ acrylontirile and 72% butadiene, Molecular weight ML(1+4)=35) available from Uniroyal Corporation, 14.4 gms of Sunpar 150, a paraffin oil which is a plasticizer for the EPDM, 33.6 gms of Plasthall DOS (Dioctyl sebacate) which is a plasticizer for NBR and 48 gms of different C-blacks as shown below in Table 5. These materials were intensively shear mixed for 5 to 7 minutes in a 300 cc Midget Banbury. The temperature of the mixture was controlled by cooling the external jacket of the mixer with water and was not allowed to exceed 150° C. At the end of he mixing cycle contents of the mixer were removed, cooled and compacted to remove any entrained air bubbles on a room temperature mill and section of he blend were prepared for analysis. These blends were compared to blends in the same composition made with a nonfunctional EPDM (Composition: 70% ethylene, 5% ENB, Molecular weight ML(1+4)=55) available as V-7000 from Exxon Chemical Company.

A small amount (approximately 0.125"×0.125"×0.25") piece of the polymer blend made above was mounted on an Reichert cryogenic ultramicrotome and several thin sections (approximately 100 m thick) were removed and examined in a transmission electron microscope. Images of these sections, recorded as photomicrographs herewith enclosed, show at magnification of 50000 to 100000 showed striking differences in the distribution of the C-black between the EPDM and NBR phases depending on the presence or absence of amine groups on the EPDM. Blends containing amine EPDM showed a very uniform distribution of C-black between the two rubber phases whereas the blend containing non functional EPDM showed complete localization of the C-black into the NBR phase alone. This is shown in the micrographs of FIG.'s 7 and 8 for the carbon black N234 in the blends of EPDM with NBR. This phenomena was true for all of the C-blacks studied as shown in Table 7 below.

TABLE 7

| C Black ASTM Blend | Surface Area (nitrogen) m**2/gm | Structure factor (DBPA) cc/100 g | Distr. of C Black | |
|---|---|---|---|---|
| | | | Amino Funct. EPDM Blend | Non funct. EPDM |
| N235 | 125 | 120 | uniform | only in NBR |
| N330 | 80 | 100 | uniform | only in NBR |

TABLE 7-continued

| C Black ASTM Blend | Surface Area (nitrogen) m**2/gm | Structure factor (DBPA) cc/100 g | Distr. of C Black | |
|---|---|---|---|---|
| | | | Amino Funct. EPDM Blend | Non funct. EPDM |
| N550 | 38 | 120 | uniform | only in NBR |
| N650 | 35 | 120 | uniform | only in NBR |
| N762 | 25 | 65 | | only in NBR |

Example 17

In this example EPDM polymers were blended with carbon black, process oils and antioxidants according to the following composition.
EPDM polymer—100 gms
Carbon black—50 gms
Oil—Sunpar 150—80 gms
Vulkanox ZMB—2—1.0 gms
Naugard 445—2.0 gms
Four different EPDM polymers were used as shown in the table below
EPDM-A: Ethylene 70%, ENB 5%, ML(1+4) @ 125=60
EPDM-B: Ethylene 68%, ENB 4.9%, ML(1+4) @ 125=63, 5-norbornene-2-methyl amine=2.51%
EPDM-C: Ethylene 67%, ENB 5.6%, ML(1+4) @ 125=58, 5-norbornene-2-methyl amine=1.93%
EPDM-D: Ethylene 74%, ENB 4.5%, ML(1+4) @ 125=74, 5-norbornene-2-methyl amine=1.0%

Each of the above polymers was mixed with one of the carbon blacks as shown in the table 8 below

TABLE 8

| | N550 | N219 | N234 | N762 | N330 |
|---|---|---|---|---|---|
| A | 17-1 | 17-2 | 17-3 | 17-4 | 17-5 |
| B | 17-6 | 17-7 | 17-8 | 17-9 | 17-10 |
| C | 17-11 | 17-12 | 1713 | 17-14 | 17-15 |
| D | 17-16 | 17-17 | 17-18 | 17-19 | 17-20 |

The viscosity of these polymer blends was measured using a Capillary Gottfert Rheometer using a die of 2 mm diameter with a L/D of 10. Viscosity was measured at a various shear rates from 1.24 s-1 to 275 s-1 in gradual increments at temperatures of 100°, 120°, 140°, 160° and 180° C. The viscosity of these polymer blends is reported (in Pa.s) for these temperatures at shear rate 12.5 (s-1).

| Blend | 100° C. | 120° C. | 140° C. | 160° C. | 180° C. |
|---|---|---|---|---|---|
| 17-1 | 10600 | 7900 | 6340 | 4980 | 4000 |
| 17-2 | 11000 | 8490 | 6730 | 5560 | 4980 |
| 17-3 | 11600 | 8690 | 6730 | 5370 | 4780 |
| 17-4 | 10800 | — | 3220 | 4200 | — |
| 17-5 | 12000 | 9270 | 7110 | 5170 | 4390 |
| 17-6 | 18200 | 16100 | 16900 | 15500 | 14000 |
| 17-7 | 20800 | 21000 | 17300 | 15900 | 16900 |
| 17-8 | 22500 | 21000 | 19200 | — | 14500 |
| 17-9 | 16900 | 19800 | 18800 | 17900 | 16400 |
| 17-10 | 20800 | 19900 | 18600 | 16700 | 21000 |
| 17-11 | 15100 | 12200 | 10200 | 15100 | 14700 |
| 17-12 | 17300 | 16200 | 15100 | 14100 | 13500 |
| 17-13 | 22100 | 19700 | 18700 | 16700 | 16500 |
| 17-14 | 13200 | 12200 | 11300 | 10700 | 10100 |
| 17-15 | 16500 | 14500 | 12300 | 16500 | 16500 |
| 17-16 | 16700 | 13800 | 11600 | 13000 | 12200 |
| 17-17 | 19000 | 16900 | 17900 | 14400 | 22700 |
| 17-18 | 24600 | 18200 | 16900 | 24400 | 22200 |
| 17-19 | 15400 | 12500 | 17500 | 16900 | 16100 |
| 17-20 | 19000 | 18800 | 16700 | 15000 | 21600 |

This example shows that EPDM polymers with amine groups have a stronger affinity for carbon black than the corresponding polymers without amine functionality. This stronger affinity translates into higher viscosity for the blends at all temperatures.

Example 18

In this example EPDM polymers were blended with carbon black, process oils, antioxidants and curatives according to the following composition.
EPDM polymer—100 gms
Carbon black—65 gms
Process Oil—Sunpar 150—75 gms
Vulkanox ZMB—2—1.0 gms
Naugard 445—1.0 gms
Vulkup R—2.0 gms
EDMA—1.0 gms The four different EPDM polymers of example 17 were used as shown in the table 9 below.

TABLE 9

|   | N330 | N762 | N234 | N219 | N550 |
|---|------|------|------|------|------|
| A | 18-1 | 18-2 | 18-3 | 18-4 | 18-5 |
| B | 18-6 | 18-7 | 18-8 | 18-9 | 18-10 |
| C | 18-11 | 18-12 | 18-13 | 18-14 | 18-15 |
| D | 18-16 | 18-17 | 18-18 | 18-19 | 18-20 |

These polymer blends were tested as follows:

Green strength of the uncured polymer was measured at 60° C. which is above the melting point of the ethylene crystallinity of the polymer Pads of the polymer were cured for 20 m at 170° C. and the standard tensile test specimens were soaked in process oil at 100° C. for 72 hours and then the volume expansion of the specimen and the tensile strength of the specimen at 60° C. was determined.

TABLE 10

| Blend | Green Str. at 60° C. (MPa) | Vol. Expansion after oil soak at 100° C. (%) | Tensile Strength at 60° C. aft. oil soak at 100° C. (Mpa) |
|-------|------|------|------|
| 18-1 | .07 | 270 | .23 |
| 18-2 | .08 | 280 | .23 |
| 18-3 | .11 | 230 | .27 |
| 18-4 | .09 | 240 | .26 |
| 18-5 | .09 | 290 | .28 |
| 18-6 | .55 | 90 | 1.48 |
| 18-7 | .57 | 90 | 1.45 |
| 18-8 | .89 | 85 | 1.67 |
| 18-9 | .86 | 100 | 1.76 |
| 18-10 | .72 | 85 | 1.98 |
| 18-11 | .46 | 130 | 1.45 |
| 18-12 | .43 | 130 | 1.34 |
| 18-13 | .40 | 140 | 1.32 |
| 18-14 | .41 | 150 | 1.43 |
| 18-15 | .27 | 130 | 1.21 |
| 18-16 | .19 | 170 | 0.90 |
| 18-17 | .23 | 150 | 0.85 |
| 18-18 | .19 | 170 | 0.98 |
| 18-19 | .20 | 190 | 0.93 |
| 18-20 | .20 | 180 | 0.78 |

These data shows that the amino functionalized saturated or nearly saturated elastomers have a stronger affinity for carbon black than the nonfunctional elastomers.

Example 19

In this example EPDM polymers were blended with carbon black, process oil, antioxidants, and curatives according to the following composition: EPDM (100 gm); carbon black (65 gms); process oil- Sunpar 150 (75 gms); Vulkanox 2MB-2 (1.0 gm); Naugard 445 (1.0 G) and Vulkux R (2.0 g). The four different EPDM and EPDM-amine polymers of example 17 were used as shown in table 11 below:

TABLE 11

|   | N330 | N762 | N234 | N219 | N550 |
|---|------|------|------|------|------|
| A | 19-1 | 19-2 | 19-3 | 19-4 | 19-5 |
| B | 19-6 | 19-7 | 19-8 | 19-9 | 19-10 |
| C | 19-11 | 19-12 | 19-13 | 19-14 | 19-15 |
| D | 19-16 | 19-17 | 19-18 | 19-19 | 19-20 |

The polymer blends were cured at 170 degrees C. and the cure meter torque curves were recorded in Table 12.

TABLE 12

| POLYMERS | 19-1 | 19-2 | 19-3 | 19-4 | 19.5 | 19-6 | 19-7 | 19-8 | 19-9 | 19-10 | 19-11 | 19-12 |
|---|---|---|---|---|---|---|---|---|---|---|---|---|
| ML (in lb) | 3.83 | 2.94 | 4.13 | 3.34 | 3.25 | 17.94 | 12.16 | 17.9 | 19.49 | 16.52 | 11.76 | 6.98 |
| MH (in lb) | 21.47 | 20.45 | 25.85 | 21.91 | 20.94 | 35.81 | 31.75 | 37.52 | 39.12 | 32.37 | 28.22 | 22.22 |
| Ts2 (min) | 3.94 | 3.82 | 3.69 | 3.51 | 3.3 | 3.76 | 3.95 | 3.91 | 3.52 | 4.21 | 4.31 | 4.01 |
| T' 90 (min) | 18.64 | 16.64 | 18.47 | 18.23 | 16.04 | 17.1 | 16.87 | 17.02 | 16.56 | 17.47 | 17.48 | 17.15 |
| Rate (in. lb./min.) | 1.3 | 1.7 | 1.6 | 1.5 | 2 | 2.1 | 2.3 | 2.3 | 2.3 | 1.9 | 1.6 | 1.8 |
| Delta M (in. lb.) | 17.64 | 17.51 | 21.72 | 18.57 | 17.69 | 17.87 | 19.59 | 19.38 | 19.63 | 15.85 | 16.46 | 15.24 |

| POLYMERS | 19-13 | 19-14 | 19-15 | 19-16 | 19-17 | 19-18 | 19-19 | 19-20 |
|---|---|---|---|---|---|---|---|---|
| ML (in lb) | 15.39 | 11.75 | 9.68 | 10 | 4.93 | 14.49 | 9.29 | 6.27 |
| MH (in lb) | 34.67 | 31.91 | 23.34 | 23.04 | 15.57 | 28.62 | 22.73 | 18.97 |
| Ts2 (min) | 4.35 | 3.82 | 4.73 | 5.04 | 4.8 | 4.86 | 4.41 | 4.51 |
| T' 90 (min) | 17.47 | 17.41 | 17.69 | 17.79 | 17.35 | 18.21 | 18.53 | 17.07 |
| Rate (in. lb./min.) | 2 | 1.9 | 1.7 | 1.2 | 1.1 | 1.2 | 1 | 1.5 |
| Delta M (in. lb.) | 19.28 | 20.16 | 13.66 | 13.04 | 10.64 | 14.13 | 13.44 | 12.7 |

As is apparent from the foregoing description, the materials prepared and the procedures followed relate to specific embodiments of the broad invention. It is apparent from the foregoing general description and the specific embodiments that while forms of the inventions have been illustrated and described, various modifications can be made without departing from the spirit and scope of this invention. Accordingly, it is not intended that the invention be limited thereby.

We claim:

1. A method for controlling carbon black distribution in elastomer blends comprising blending a amine functionalized non-polar elastomer with at least one polar elastomer, carbon black and optionally a vulcanization agent.

2. The method of claim 1 wherein the non-polar elastomer is a homopolymer or a copolymer of isobutylene.

3. The method of claim 1 wherein the non-polar elastomer is a homopolymer or a copolymer of isobutylene and the amine is diethanolamine.

4. The method of claim 1 wherein the amine functionalized elastomer is an isomonoolefin/p-alkylstyrene/p-bromoalkylstyrene copolymer and the amine is diethanolamine.

5. The method of claim 2 wherein the polyisobutylene is a copolymer of isobutylene and about 0.2 to about 40 wt. % of one or more alpha olefins, diolefins, styrene or isoprene, based upon the weight of the polymer.

6. The method of claim 1 wherein the elastomer of the amine functionalized elastomer is an ethylene alpha-olefin non-conjugated diene copolymer or an ethylene propylene copolymer and the amine is a primary, secondary or tertiary group.

7. The method of claim 1 wherein elastomer of the amine functionalized elastomer is an ethylene propylene 5-ethylidene-2-norbornene copolymer or an ethylene propylene copolymer and the amine is polymerized into the copolymer.

8. The method of claim 1 wherein elastomer of the amine functionalized elastomer is an ethylene propylene 5-ethylidene-2-norbornene copolymer or an ethylene propylene copolymer and the amine is grafted onto the copolymer.

9. The method of claim 1 wherein the elastomer of the amine functionalized elastomer is isobutylene/p-methylstyrene/p-bromomethylstyrene copolymer or isobutylene/paramethyl styrene copolymer.

10. The method of claim 1 wherein the polar elastomer is one or more of natural rubber, polybutadiene rubber, acrylonitrile butadiene rubber, polychloroprene rubber, acrylonitrile isoprene rubber, halogenated acrylonitrile isoprene rubber, acrylonitrile chlorinated isoprene rubber, styrene butadiene rubber, styrene butadiene styrene block copolymer, polyisoprene rubber, alkyl acrylate rubber, halogenated isoprene rubber, or chlorinated isoprene rubber.

11. The method of claim 1 wherein the polar elastomer is acrylonitrile butadiene rubber or polychloroprene and the non-polar elastomer is an ethylene alpha-olefin non-conjugated diene copolymer or an isobutylene polymer.

12. The method of claim 1 wherein the non-polar elastomer is a copolymer of isobutylene and para-methylstyrene.

13. The method of claim 1 wherein the amine functionalized non-polar elastomer is present from 5 to 95 phr.

14. The method of claim 1 wherein the carbon black is present at from 10 to 150 phr.

15. The method of claim 1 wherein the non-polar elastomer has about 0.01 to about 20 wt % of amine groups attached thereto, based upon the weight of the non-polar elastomer and the amine attached thereto.

16. The product of the method of claim 1 formed into an article.

17. A composition comprising carbon black, an amine functionalized non-polar elastomer, at least one polar elastomer and optionally a vulcanization agent.

18. The composition of claim 17 wherein the polar elastomer is one of or a mixture of natural rubber, polybutadiene rubber, acrylonitrile butadiene rubber, polychloroprene rubber, acrylonitrile isoprene rubber, halogenated acrylonitrile isoprene rubber, acrylonitrile chlorinated isoprene rubber, styrene butadiene rubber, styrene butadiene styrene block copolymer, polyisoprene rubber, alkyl acrylate rubber, halogenated isoprene rubber, or chlorinated isoprene rubber.

19. The composition of claim 17 wherein the elastomer of the amine functionalized elastomer is ethylene propylene diene rubber, polyisobutylene rubber, or a copolymer of isobutylene and one or more of an alpha olefin, a diolefin, styrene or isoprene.

20. The composition of claim 17 wherein the elastomer of the amine functionalized elastomer is a copolymer of isobutylene and comonomer functionalized benzylic or allylic halide.

21. The composition of claim 17 wherein the elastomer of the amine functionalized elastomer is an ethylene propylene non-conjugated diene copolymer and the amine is a secondary or tertiary amine.

22. The composition of claim 17 where the elastomer of the amine functionalized elastomer is a homopolymer or copolymer of isobutylene and the amine is diethanol amine.

23. An article comprising the composition of claim 17.

24. A belt, hose, bumper or container comprising the composition of claim 17.

25. An article comprising the composition of claim 20.

26. The composition of claim 17 wherein the non-polar elastomer is EPDM and the composition is solvent resistant.

27. The composition of claim 17 wherein the amine functionalized non-polar elastomer is present from 5 to 95 phr.

28. The composition of claim 17 wherein the carbon black is present at from 10 to 150 phr.

29. The composition of claim 17 wherein the non-polar elastomer has about 0.01 to about 20 wt. % of amine groups attached there to, based upon the weight of the non-polar elastomer and the amine attached thereto.

30. The composition of claim 17 wherein carbon black is present in the non-polar elastomer phase.

31. The composition of claim 17 wherein the concentration of the carbon black in the non-polar elastomer phase is at least 20 percent of the concentration of the carbon black in the polar elastomer phase.

32. A method for controlling carbon black distribution in elastomer blends comprising blending a amine functionalized non-polar elastomer with at least one dissimilar elastomer, carbon black and optionally a vulcanization agent.

* * * * *